US009961337B2

(12) United States Patent
Stroetmann

(10) Patent No.: US 9,961,337 B2
(45) Date of Patent: *May 1, 2018

(54) FLEXIBLE DISPLAY DEVICE AND COMPUTER WITH SENSORS AND CONTROL APPROACHES

(71) Applicant: Christian Stroetmann, Moers (DE)

(72) Inventor: Christian Stroetmann, Moers (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/789,272

(22) Filed: Jul. 1, 2015

(65) Prior Publication Data

US 2016/0014403 A1    Jan. 14, 2016

(30) Foreign Application Priority Data

Jul. 11, 2014 (DE) .................... 20 2014 103 215 U

(51) Int. Cl.
*G06F 3/01* (2006.01)
*G06F 1/16* (2006.01)
(Continued)

(52) U.S. Cl.
CPC ....... *H04N 13/0497* (2013.01); *G06F 1/1641* (2013.01); *G06F 1/1652* (2013.01); *G06F 1/1679* (2013.01); *G06F 1/1681* (2013.01); *G06F 3/017* (2013.01); *H04N 13/0018* (2013.01); *H04N 13/0402* (2013.01); *H04N 13/044* (2013.01); *H04N 13/0468* (2013.01)

(58) Field of Classification Search
CPC ...... G06F 1/1652; G06F 1/1641; G06F 3/017; G06F 1/1681; G06F 1/1679
See application file for complete search history.

(56) References Cited

U.S. PATENT DOCUMENTS 7,715,790 B1 * 5/2010 Kennedy ........... H04M 1/72572
455/41.2
8,788,977 B2   7/2014 Bezos
(Continued)

OTHER PUBLICATIONS

Frommer, Dan, "The first iPhone didn't have a normal headphone jack, either", Sep. 10, 2016, http://www.recode.net/2016/9/10/12871500/iphone-2007-headphone-jack.*

(Continued)

Primary Examiner — Larry Sternbane

(57) ABSTRACT

Embodiments of a flexible electronic visual display device and a flexible mobile computer having such a display device are disclosed. The basic electronic visual display device comprises a flexible display device, at least one control system, at least one three-dimensional sensor, a flexible housing containing the electronic components, and an adjustment means for the housing. In some embodiments, the flexible display device can have additional sensors of various types, a projector, a wireless communication interface, and a wireless power supply. For independent use some embodiments of the flexible electronic visual display device can also comprise an electronic module including at least one processor and at least one data memory, and also at least one electrical energy storage device being contained in the housing as well. This permits the flexible electronic display device to provide a broad range of functionalities and application possibilities, and to assume novel functionalities and applications.

37 Claims, 9 Drawing Sheets

(51) Int. Cl.
*H04N 13/04* (2006.01)
*H04N 13/00* (2006.01)

(56) References Cited

U.S. PATENT DOCUMENTS

| | | | |
|---|---|---|---|
| 8,891,868 B1 | 11/2014 | Ivanchenko | |
| 8,933,876 B2 | 1/2015 | Galor et al. | |
| 9,158,115 B1* | 10/2015 | Worley | G02B 27/0172 |
| 2011/0101654 A1* | 5/2011 | Cech | B60R 11/0247 |
| | | | 280/728.3 |
| 2013/0134931 A1* | 5/2013 | Tomiki | H04B 5/0037 |
| | | | 320/108 |
| 2013/0222246 A1 | 8/2013 | Booms et al. | |
| 2014/0063046 A1* | 3/2014 | Jung | G06F 1/1652 |
| | | | 345/592 |
| 2014/0320436 A1* | 10/2014 | Modarres | G06F 3/0412 |
| | | | 345/173 |
| 2014/0368422 A1* | 12/2014 | Gupta | G06F 3/0304 |
| | | | 345/156 |
| 2015/0009125 A1* | 1/2015 | Kim | G06F 3/0488 |
| | | | 345/156 |
| 2015/0153779 A1* | 6/2015 | Ko | G06F 1/1652 |
| | | | 345/173 |
| 2015/0241978 A1* | 8/2015 | Lombardi | G06F 3/017 |
| | | | 345/156 |
| 2015/0277496 A1* | 10/2015 | Reeves | G06F 1/1641 |
| | | | 345/1.2 |
| 2016/0212864 A1* | 7/2016 | Lee | G06F 1/1652 |

OTHER PUBLICATIONS

Malte Weiss, Simon Voelker, and Jan Borchers, "BendDesk: Seamless Integration of Horizontal and Vertical Multi-Touch Surfaces in Desk Environments", Adjunct Proceedings ITS '09, ACM, New York, NY, USA, 2009.

Wetzstein, G., Lanman, D., Hirsch, M., Raskar, R.,Tensor Displays: Compressive Light Field Synthesis using Multilayer Displays with Directional Backlighting, ACM Transactions on Graphics (SIGGRAPH), 2012, scientific paper, MIT Media Lab, U.S.A.

* cited by examiner

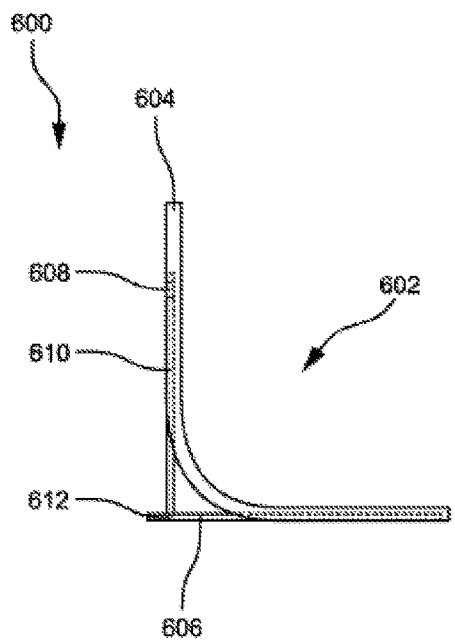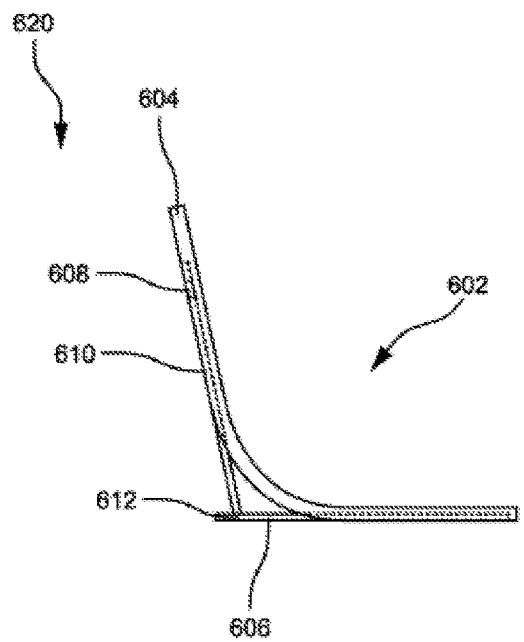
FIG. 6A  FIG. 6B
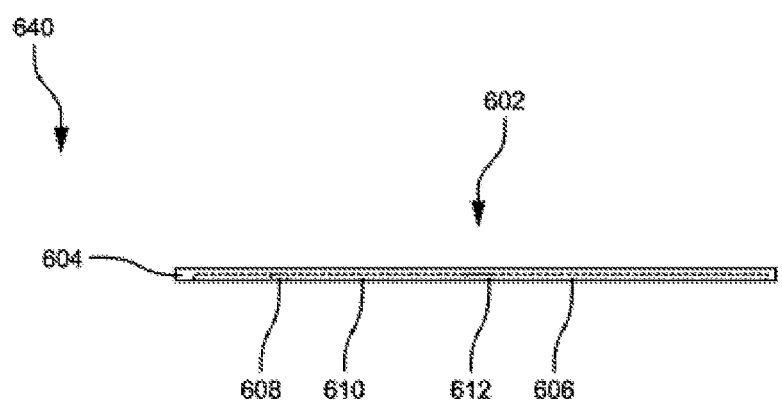
FIG. 6C

FLEXIBLE DISPLAY DEVICE AND COMPUTER WITH SENSORS AND CONTROL APPROACHES

CROSS-REFERENCE TO RELATED APPLICATION

This application claims the benefit of the German Utility Model Application No. 20-2014-103-215.0, filed Jul. 11, 2014, and entitled "Elektronisches, visuelles Gerät, das eine flexible beziehungsweise biegbare Vorrichtung zur optischen Signalisierung von veränderlichen Informationen, ein flexibles beziehungsweise biegbares Gehäuse mit mindestens einem Gelenk/Scharnier und ein Regel-/Steuerungssystem besitzt", which is hereby incorporated by reference in its entirety.

BACKGROUND

1. Field of the Disclosure

The present application relates generally to flexible display devices and to computing devices with such a display. More particularly, the present invention pertains to stationary flexible display devices and to stationary and portable flexible computing devices with at least one flexible display screen and at least a three-dimensional sensor as well as flexible display devices

2. Description of the Related Art

People are using various types of devices with display devices having various dimensions, such as a television set, a stationary computer system, and a mobile computer system, to view content for various personal and professional reasons. The typical display device of such devices has a flat screen and is either a vertically standing display, a horizontally lying display, or a display held at an angle. But display devices are not bound to a flat shape. For example, one direction of technological development are display devices with flexible screens or/and combined vertical and horizontal screens.

Furthermore, for most people from many different disciplines a desk with a computer system is the main workspace. Such a typical computer workplace integrates horizontal and vertical surfaces into the workspace and encompasses one or more vertical displays showing digital content and a larger horizontal area containing input devices, such as a mouse and a keyboard, a paper-based document, and everyday objects. Also, touch recognition technologies have combined the advantages of traditional input metaphors with digital documents. For example, a tablet computer allows high precision stylus input for graphic design, a digital pen enables annotations on physical paper, and multi-touch gestures provide an intuitive way to transform and modify digital data.

Many systems have been proposed that use vertical and horizontal interactive surfaces within a single computer workplace. These systems provide a large interactive area and allow to move digital objects across multiple displays.

However, despite all the advantages these interfaces have barely found their way into everyday workspaces yet. Some reasons might be that these two areas are clearly separated, which makes it hard to move documents from one surface to the other, and that each area employs a different interaction technique. For example, we use a mouse for drawing on vertical displays but a physical pen to annotate a paper-based document. A workspace that allows continuous interaction between both areas. Moreover, these systems suffer from a lack of spatial continuity. Gaps between adjacent displays suggest isolated interactive areas, objects belonging together may be separated across gaps between display devices, and splitting objects across device borders impairs search accuracy and steering performance. Eventually, these setups limit the applicability of for example direct manipulation, as movement trajectories are interrupted when dragging a finger or pen from screen to screen.

Another direction of technological development related with computer workspaces are display devices, which combine the vertical and horizontal screens, like for example the so-called holobench or workbench as shown in FIG. 1. A holobench 100 is a semi-immersive projection display device for working in virtual reality environments, that is constructed by two screens 112, 114 put together in an L-shaped display providing one vertical backplane projection screen 114 and one horizontal backplane projection screen 112, and using the active stereo-projection mode for the rendering of stereoscopic images by the projectors 102, 104 beaming images over the mirrors 106, 108 on the screens 112, 114 to generate a three-dimensional impression for a user wearing shutter glasses. With the help of a position detecting and motion tracking system and a related control system the position, orientation, and movement of the user's head are captured and the perspective of the three-dimensional scene displayed with the holobench is altered by a rendering circuitry accordingly.

However, a problem with these display devices is that the horizontal and vertical screens are perceived as isolated areas and that by the L-shape edge a smooth, fluent transition of the displayed content cannot be realized between the vertical and horizontal screens.

As part of the research project "BendDesk" shown in FIGS. 2A and 2B a desk environment 200 has been presented that merges a vertical backplane projection screen 216 and a horizontal backplane projection screen 212 into one interactive workspace using a curved projection screen 214 between the vertical and horizontal screens. Two projectors 202, 204 for the graphical output and three two-dimensional cameras 222, 224, and 226 for the multi-touch input are used. The curved projection system provides a large multi-touch area 211 within the user's reach and allows uninterrupted, seamless dragging gestures across the entire display screen 211. This workspace can be used to display any digital content like documents, photos, or videos. The multi-touch technology allows the user to interact with the entire display screen 211 by direct manipulation and multi-touch gestures. Special care was also taken in relation with the ergonomics, so that users can comfortably sit at the desk environment and place everyday objects on it.

In the research project "Curve" similar ergonomics and design considerations for building a curved multi-touch table have been presented. The multi-touch table also consists of a vertical and a horizontal interactive screen seamlessly blended by a curved screen segment to bridge the gap between physical desks or tables and digital desktop environments.

As part of another research project "Mirage Table" the technologies of the curved desktop environment and the holobench have been integrated with a desk environment including a curved projection screen, a stereo projector device, a pair of shutter glasses, a stereo sync emitter, a range camera or depth camera respectively three-dimensional scanner device comprising an infrared projector and a camera, and employing a variant of image-based three-dimensional reconstruction to generate a related dense three-dimensional image of objects and individuals, and a special microchip to track the movement of these objects and individuals in three dimensions. The curved workbench also supports tangible interfaces.

But still not all problems have been solved with these curved display devices, and accordingly several areas of technical problems and general demands have been determined.

Firstly, the display devices respectively workspace environments lack of display quality. The applied backplane projection and frontplane projection technologies do not result in a high brightness compared to directly observed display devices. Also, the frontplane projection has the disadvantage that the user might get between the projector and the projection screen, so that parts of the projected image are projected on the user and not on the projection screen.

Secondly, solving the problem of an L-shaped display device with curved display devices leads to other problems. For example findings of the research project "BendDesk" showed that dragging across a curve is significantly slower than on flat surfaces, a smaller entrance angle when dragging across the curve yields in a longer average trajectory and a higher variance of trajectories across users, and the curved shape of the system impairs virtual aiming at targets. In addition, the proposed L-shaped and curved display devices either are based on multi-touch user interfaces or on three-dimensional display devices that need special glasses for viewing.

Thirdly, the display devices are large and unhandy. Flexible and particularly rollable visual display devices may be a solution to these problems, but then a flexible display device needs a housing, a frame, or some other means to keep its shape and to be foldable or rollable. Another solution is to have a portable variant of such a stationary display device with a related computer system arranged in a housing as well.

Fourthly, flexible devices need a sensor for a contactless user interface, a three-dimensional camera or a three-dimensional scanner device for detecting the position and orientation and tracking the motion of arbitrary objects and features of a user, such as a hand, a head, an eye, and another body feature, for capturing informations related with gestures for example, and for making three-dimensional images. Portable variants of such as display device may also have a sensor for tracking their own motion.

Furthermore, the combination of horizontal and vertical interactive surfaces has mostly been applied for displaying scientific data and computer generated models, and realizing collaborative workspaces, remote desk environments, and remote collaboration and communication systems. But there is still a demand for more functionalities and applications.

SUMMARY

In accordance with the purpose of the invention, as embodied and broadly described, the invention pertains to a flexible electronic visual display device, and extensions of such an electronic device to a flexible stationary computer system and a flexible mobile computer system. The disclosed electronic device features a relatively large, interactive area in respect to a specific device class, as well as different input modalities, output modalities, and further functionalities and application possibilities, which also provide the foundations for novel functionalities and applications.

The basic electronic visual display device comprises a flexible display device, at least one three-dimensional sensor, at least one control system, a flexible housing containing the electronic components, and an adjustment means for the housing. In some embodiments, the flexible electronic visual display device can have additional two- and three-dimensional sensors of various types, an image projector, a wireless communication interface, and a wireless power supply. For independent use some embodiments of the flexible electronic visual display device can also comprise an electronic module including at least one processor and at least one data memory, and also at least one electrical energy storage device being contained in the housing as well.

Several embodiments of the present invention provide different basic types of the flexible display device, which can be a liquid crystal display, a light-emitting diode display, a quantum dot based light-emitting diode display, a laser diode display, and an electronic paper display, and also different functional types, which can be a multi-layered display and a three-dimensional display, to name just some preferred examples.

In order to achieve the above and other objects, several embodiments of the present invention also provide different types of two- and three-dimensional sensors, and different types of related control systems. With these components the electronic display device is able to capture various optical, acoustical, and other physical information by the sensors, and to process the captured sensor information, execute predetermined functions, and issue corresponding commands to control other electronic components of the electronic display device by related control systems accordingly. A preferred class of functionality provided in this way comprises various types of user interfaces, particularly graphical user interfaces and natural user interfaces, including direct manipulations by multi-touch, gestures, and also kinetic user interfaces, including again tangible user interfaces, as well as voice user interfaces, which all can be combined with each other to realize multimodal user interfaces.

But also the display device itself can be controlled with these sensors and related control systems. For example, a three-dimensional sensor can be used to detect the position and motion of a user's feature with respect to the electronic device, and in the case of a portable variant the position and motion of the device itself, and then provide these captured information to the control system of the visual display device. The control system can update the viewpoint and viewing angle of a virtual camera of the rendering pipeline in response to the users's changed viewpoint or/and viewing angle on the displayed scene with respect to the electronic device. This allows the realization of for example a glasses-free flexible autostereoscopic display device.

Another provided functionality is based on the usage of an optical three-dimensional sensor as a three-dimensional scanning device to scan and digitalize objects put on the horizontal surface area of the display device for further use.

In some embodiments the invention also provides an image projector for projecting additional information on the display output and images on objects put on the horizontal surface area of the flexible electronic display device, and for providing a pointing means controlled by a user, the electronic display device itself, or/and another electronic device connected to the flexible electronic visual display device.

Several embodiments may comprise a wireless electric power link device arranged within the horizontal surface, which can be configured to wirelessly receive electric power from an external power supply, and a wireless charging means, which can be configured to supply other electrically operated devices layed on the horizontal surface with electric power.

A further aspect behind the invention is the support of a user through improved ergonomics and easier handling by providing a flexible directly observed display device with a flexible housing and an adjustment means for the housing, as it is discussed in different ways in the following.

Firstly, the directly observed display device provides a brighter presentation of visual information compared to visual systems, which are based on backplane or/and front-plane projections. Furthermore, due to the curved surface no edge at the joint of the vertical and horizontal surfaces exists and therefor the presentation of visual information is perceived as seem less on the one hand and the quality of for example a three-dimensional presentation is increased on the other hand.

Secondly, the usage of (everyday) objects is supported. With the exception of special purpose desks, such as drawing tables for example, office desks and other tables are usually horizontal, so that people can put physical objects on them. In contrast, the possibilities of placing objects onto a tilted surface, even at small angles, are limited. But with a flexible display device the horizontal surface can be adjusted as needed, so that some areas of a surface are tilted while other areas of the same surface are horizontal. Additionally, the flexible display device can be adjusted as often as needed with an adjustment means of the housing, thereby increasing its useability and supporting a more convenient use of such a display device having vertical and horizontal surfaces.

Thirdly, tilting the vertical surface backwards would reduce its reachability at the top, but the user should be able to sit and stand in front of the electronic display device in a comfortable position and to reach the entire input area without much effort. With for example a three-dimensional camera and a related control system using the flexible electronic display device does not depend on direct manipulations by touch anymore. Furthermore, the vertical surface can be adjusted in such a way that viewing and using the device is as much as comfortable and ergonomic as possible. In addition, the variable adjustment means allows tilted vertical and horizontal surfaces if needed in the case of a television set or a holobench, workbench or homebench standing on the ground, or in the case of a tablet computer or another portable device being held in the hands by a user.

Fourthly, the electronic visual display device is flexible at at least one position and in at least one dimension, and depending on a related variant can even be bent in two degrees of freedom with respect of a single dimension. The joint means of the device housing allows its opening, bending, and closing without falling below the permissible bending radius of and without applying stress on the flexible electronic visual display device. By the flexible housing the display device is also protected at its backside against mechanical damage.

Moreover, the flexibility offers easier and safer ways to transport and store such electronic visual display devices, which are relatively large dimensioned in respect to specific device classes. For example, in some embodiments the flexible display device can simply be fold together or rolled up.

Fifthly, for independent usage apart from an external power supply and an external computing device some embodiments of the electronic display device can also comprise an electronic module including at least one processor and at least one data memory, and also at least one electrical energy storage device being contained in the housing as well.

Through the combination of the different types of the flexible display device, one or more sensors, control systems, electrical energy storage devices, and other optional electronic components, many different variants of the electronic visual display can be constructed. This permits the disclosed flexible electronic visual display device to provide a broad range of functionalities and application possibilities, and to assume novel functionalities and applications, particularly in the fields of virtual reality, augmented reality, and mixed reality environments, and to support new ways of using display devices, and stationary and mobile computing systems.

The invention may be implemented in numerous ways. Exemplary preferred embodiments of the present invention are a stationary flexible electronic visual display device with a three-dimensional image sensor, a three-dimensional scanner device, or/and an image projector device, and a flexible tablet computer with a three-dimensional camera that are discussed below, but not limited to such stationary and portable electronic devices. Depending on its dimension and features the disclosed invention applies to for example a mobile phone or cell phone, specifically a smartphone, a tablet computer, an all-in-one personal computer, a television set, a curved holobench, workbench, and homebench, and such alike as well. In this conjunction, all the components or electronic units, which form the various parts of said flexible electronic visual display devices and which are known to those skilled in the art in the field of computer engineering, will not be described in detail. Only said components necessary to the elaboration of preferred embodiments of a flexible electronic visual display device according to the invention will be described.

Other systems, methods, features, advantages, objects, and further areas of applicability together with a more complete understanding of the disclosure will be, or will become, apparent and appreciated to one with skill in the art upon examination of the following figures and detailed description, or may be learned by practice of the present invention. It is intended that all such additional systems, methods, features, and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed, but are not intended to limit the scope of the disclosure.

BRIEF DESCRIPTION OF THE DRAWINGS

The accompanying drawings, which are included to provide a further understanding of the disclosure and are incorporated herein and constitute a part of this application, illustrate embodiment(s) of the disclosure and together with the description serve to explain the principle of the disclosure. In the drawings:

FIG. 6A illustrates an example adjustable supporting means for the display device standing upright;

FIG. 6B illustrates the example adjustable supporting means shown in FIG. 6A for the display device standing in a tilted position;

FIG. 6C illustrates the example adjustable supporting means shown in FIG. 6A for the display device laying out flat;

DETAILED DESCRIPTION OF THE INVENTION

Figure 1:
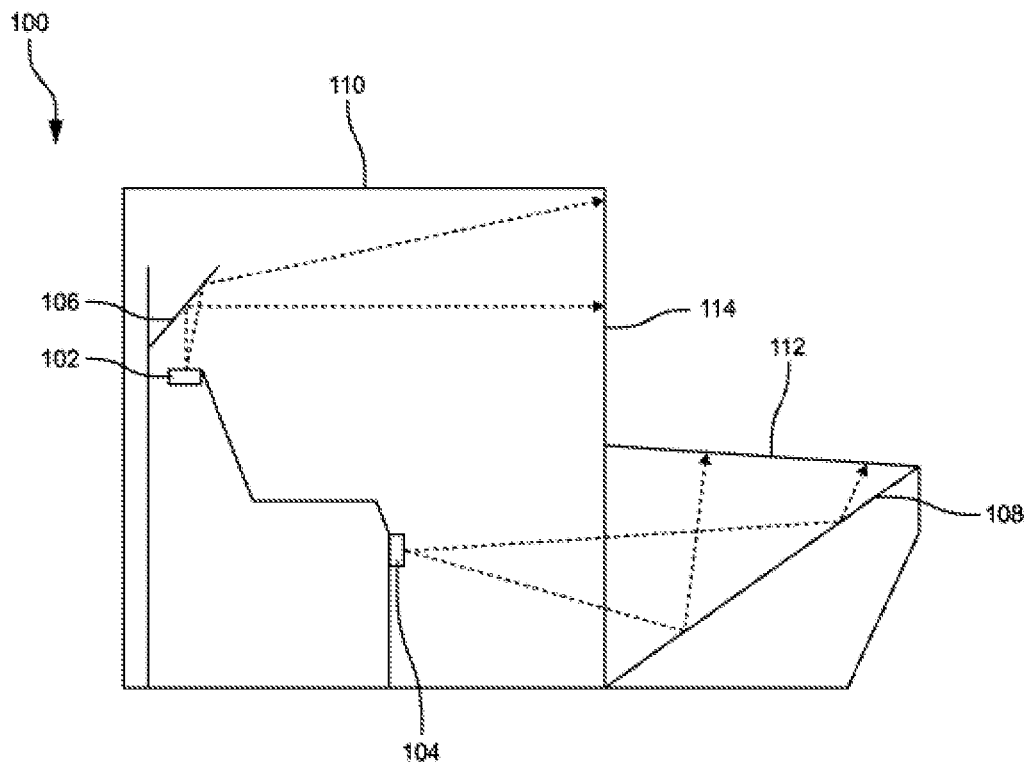
FIG. 1 illustrates a sectional side view of a holobench in accordance to a first prior art.
Figure 2A:
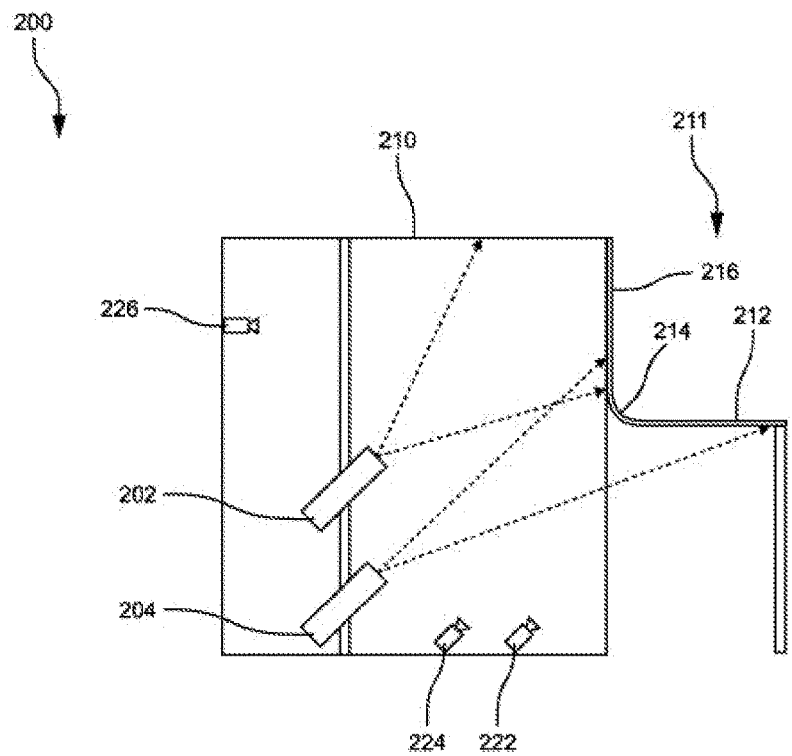
FIG. 2A illustrates a sectional side view of a desk environment with curved projection surface in accordance to a second prior art.
Figure 2B:
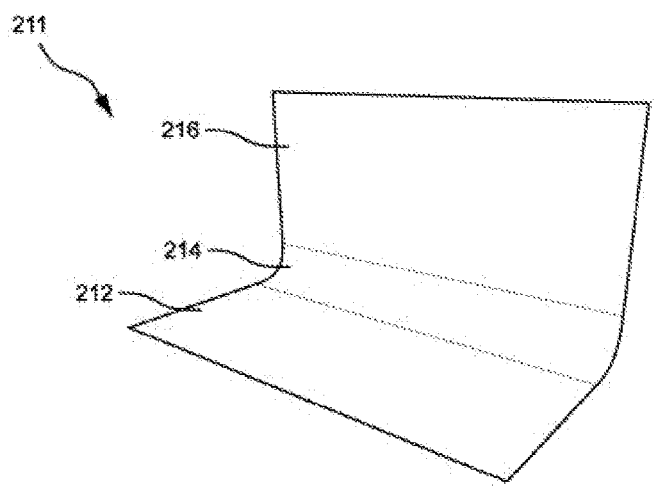
FIG. 2B illustrates a perspective view of the desk environment illustrated in FIG. 2A.
Figure 3:
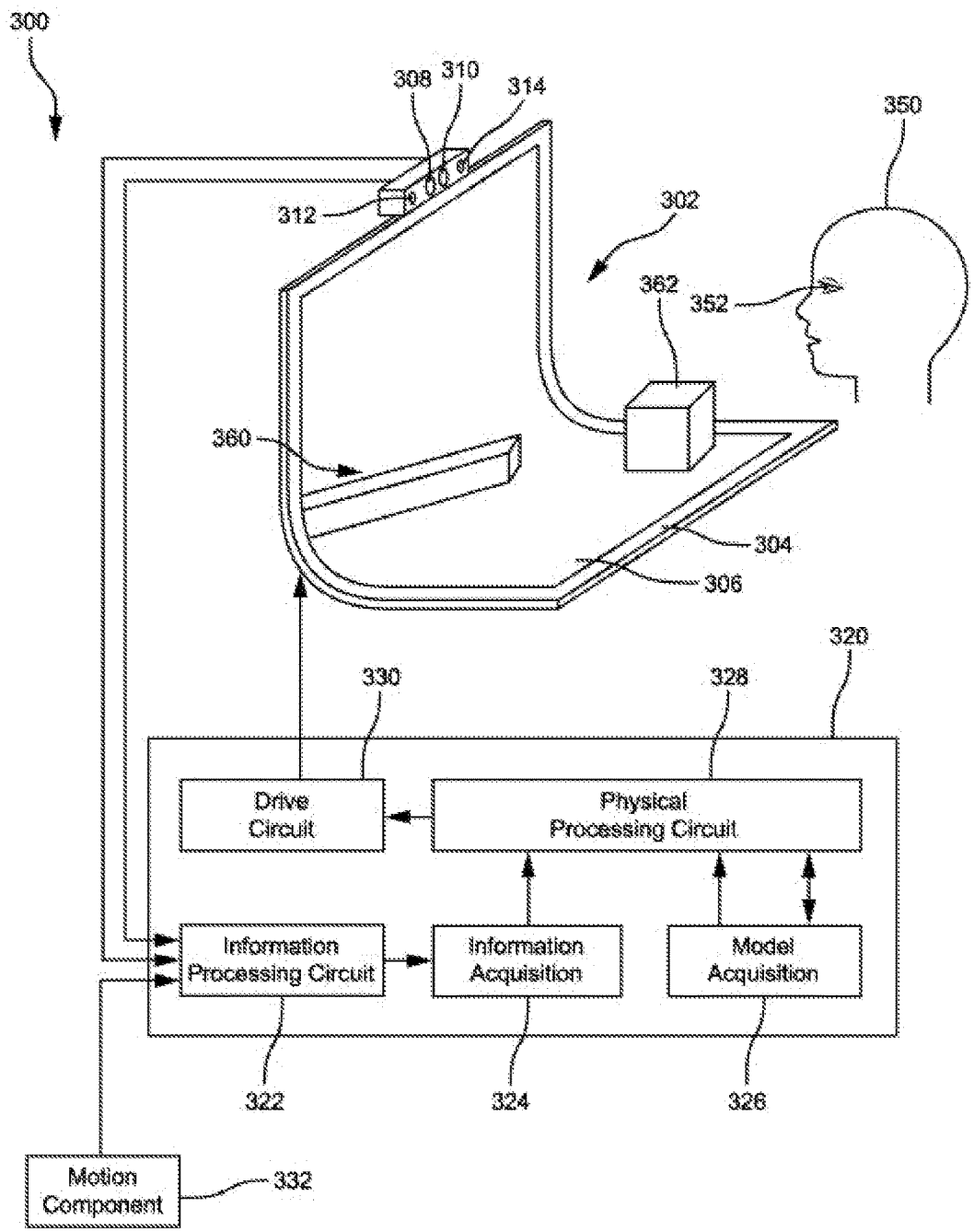
FIG. 3 illustrates an example configuration of basic components of a flexible electronic visual display device according to a first embodiment.

In order to provide various functionality described herein, FIG. 3 illustrates an example set of basic components of a flexible electronic visual display device 300 according to a first embodiment. In this example, the flexible electronic visual display device 302 features as components a flexible housing 304, a flexible capacitive or resistive multi-touch display screen 306, an image sensor or camera 308, a three-dimensional depth sensor 310, and dual-array microphones 312, 314 as information capture elements, and a control system 320, to display a three-dimensional scene 360 on the display screen to a user attempting to create, maintain, and improve a perception of depth.

The control system 320 includes an information processing circuit 322, an information acquisition component 324, a model acquisition component 326, a type of physical processing circuit 328, such as a programmable visual graphics processing unit (GPU) for example, and a drive circuit 330.

As would be apparent to one of ordinary skill in the art, the display device can include many types of display screen layer elements such as a touch screen, three-dimensional display device, multi-layer display device, liquid crystal display (LCD) device, organic light emitting diode (OLED) display device, quantum dot based light emitting diode (QLED) display device, electronic paper display device, or interferometric modulator display (IMOD) device.

In the case of an image sensor, a sensor information capture element can include, or be based at least in part upon any appropriate technology, such as a CCD or CMOS image capture element having a determined resolution, focal range, viewable area, and capture rate. Such image capture elements can also include at least one IR sensor or detector operable to capture image information for use in determining motions of the user. It should be understood, however, that there can be fewer or additional elements of similar or alternative types in other embodiments, and that there can be combinations of display screen layer elements and contactless sensors, and other such elements used with various devices.

In this example, the image sensor 308, the three-dimensional depth sensor 310, or both sensors together can track a feature of the user, such as the user's head 350, or eye 352, and provide the captured sensor information to the information processing circuit 322 of the control system 320. The information processing circuit determines the location and movement of the user's feature with respect to the display device, and provides the determined information about the position and motion of the user's feature to the information acquisition component 324 of the control system.

On the basis of the three-dimensional model of the scene and additional related information provided by the model acquisition component 326, the position and motion information provided by the information acquisition component 324, and/or the applied method for creating a perception of depth, the physical processing circuit 328 used in this case as a visual processing circuit performs the viewing transformation, including camera transformation and projection transformation, in correspondence with the change of the user's viewpoint and viewing angle on the displayed three-dimensional scene 360, performs the window-to-viewport transformation, synthesizes the two-dimensional raster representations for the display screen 306 of the flexible electronic visual display device, and provides the raster representations to the drive circuit 320. The drive circuit transfers the two-dimensional raster representations of the scene to the display screen. Methods to create a perception of depth are well known in the art and will not be discussed herein in detail.

Furthermore, the image sensor 308, the three-dimensional depth sensor 310, or both sensors together can also recognize an object 362 put on the horizontal surface of the display device, and again provide the captured sensor information to the information processing circuit 322 of the control system 320. The information processing circuit determines the location of the object with respect to the display device and the objects shape, and provides the determined information about the position and shape of the object to the information acquisition component 324 of the control system for further processing by a suitable type of physical processing circuit 328 and further use, as it would be apparent to somebody skilled in the art and therefor is not discussed further within this disclosure.

In addition, the dual-array microphones 312, 314 can capture voice commands of the user and again provide the captured sensor information to the information processing circuit 322 of the control system 320 for further processing and use. The example display device can also include at least one motion component 332, such as an electronic gyroscope, kinds of inertial sensors, or an inertial measurement unit, connected to the information processing circuit 322 of the control system 320 to determine motion of the display device arranged in a portable variant discussed elsewhere herein for assistance in location and movement information or/and user input determination.

Movement and gesture recognition approaches, as well as navigation approaches used for multi-dimensional input, as described in the U.S. Pat. No. 8,788,977, issued Jul. 22, 2014, and entitled "Movement Recognition as Input Mechanism", the U.S. Pat. No. 8,891,868, issued Nov. 18, 2014, and entitled "Recognizing gestures captured by video", the U.S. patent publication No. 2013/0222246, published Aug. 29, 2013 and entitled "Navigation Approaches for Multi-Dimensional Input", and the U.S. Pat. No. 8,933,876, issued Jan. 13, 2015, and entitled "Three-Dimensional User Interface Session Control", which are hereby incorporated herein by reference, can be applied advantageously.

Moreover, it is to be understood that any person skilled in the art should be able to construct a flexible electronic visual display device that provides a multi-modal user interface to the user by combining and integrating the various information capture elements and related control systems and control methods. In the same respect, it should be possible without any problems to integrate a wireless electric power link device within the horizontal surface, which is configured to wirelessly receive electric power from an external power supply, and a wireless charging means, which is configured to supply other electrically operated devices layed on the horizontal surface with electric power.

Figure 4:
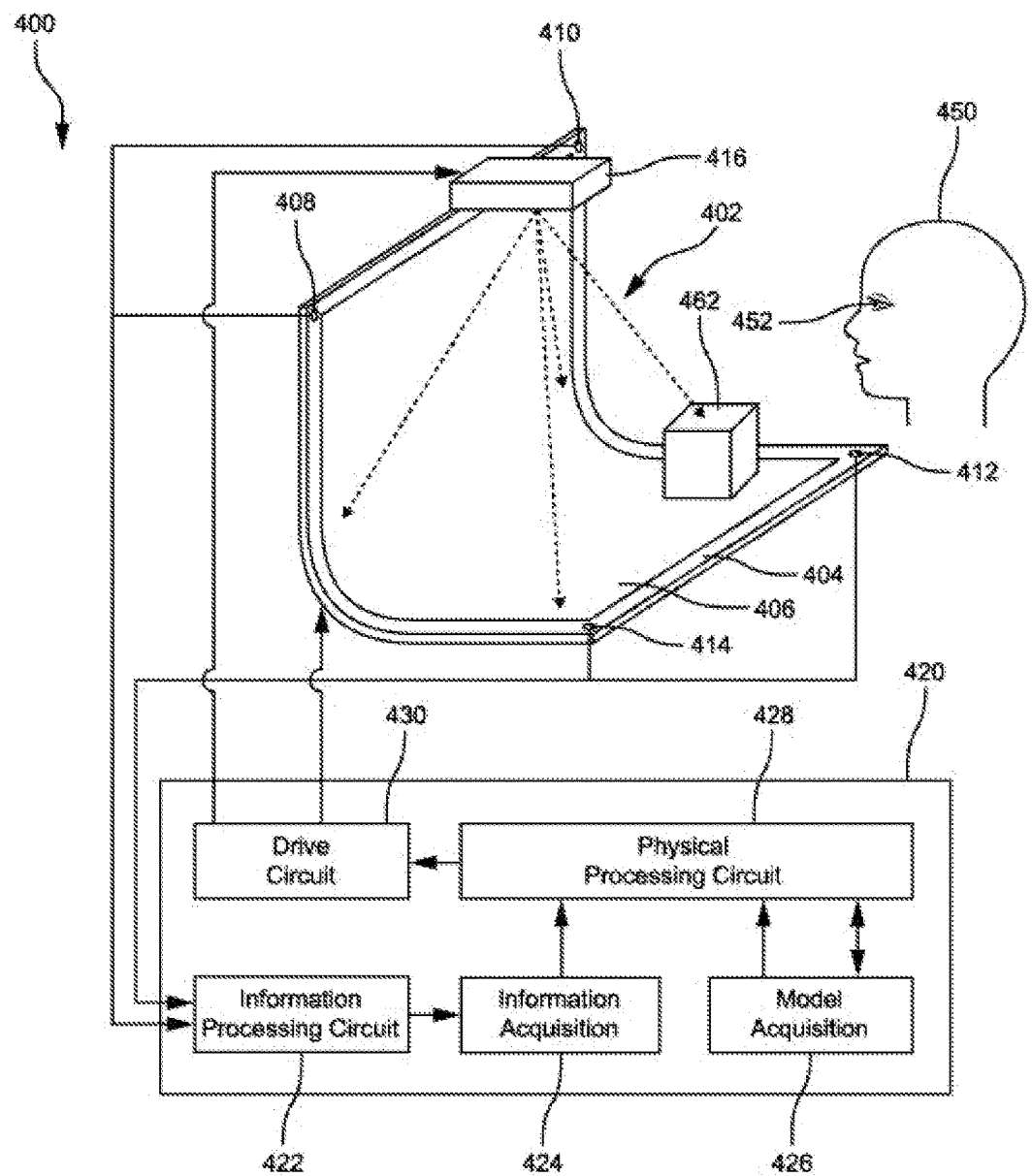
FIG. 4 illustrates an example configuration of basic components of a flexible electronic visual display device according to a second embodiment.

FIG. 4 illustrates an example set of basic components of a flexible electronic visual display device 400 according to a second embodiment. In this example, the flexible electronic visual display device 402 has a flexible housing 404, a flexible multi-touch display screen 406, four information capture elements 408, 410, 412, 414 positioned at various locations on the same side of the device as the display screen 406, a projector device 416, and a control system 420 enabling the display device to capture sensor information about a user of the device during typical operation where the user is at least partially in front of the flexible electronic visual display device, and to project images on the display screen or/and on an arbitrary object 462 put on the horizontal surface of the electronic device.

The control system 420 includes an information processing circuit 422, an information acquisition component 424, a model acquisition component 426, a type of physical processing circuit 428, such as a programmable visual graphics processing unit (GPU) for example, and a drive circuit 430.

In this example, the four image sensors 408, 410, 412, 414 can act alone, in pairs, in groups, or all together, and track a feature of the user, such as the user's head 450, or eye 452, or/and recognize the object 462 put on the horizontal surface of the display device, and provide the captured sensor information to the information processing circuit 422 of the control system 420. The information processing circuit determines the location and movement of the user's feature or/and the position and shape of the object with respect to the display device, and provides the determined information about the position and motion of the user's feature or/and the position and shape of the object to the information acquisition component 424 of the control system.

On the basis of the three-dimensional model of the scene and additional related information provided by the model acquisition component 426, and the position and motion information provided by the information acquisition component 424, the physical processing circuit 428 performs the viewing transformation, including camera transformation and projection transformation, in correspondence with the change of the user's viewpoint and viewing angle on a displayed scene, performs the window-to-viewport transformation, synthesizes the two-dimensional raster representations for the display screen 406 or/and the projector device 416 of the flexible electronic visual display device, and provides the raster representations to the drive circuit 420. The drive circuit transfers the two-dimensional raster representations of the scene to the display screen or/and the projector device. Methods to project informations on a surface, augment arbitrary objects with additional informations, and mix the outputs of a display device and a projector device are well known in the art and will not be discussed herein in detail.

Figure 5:
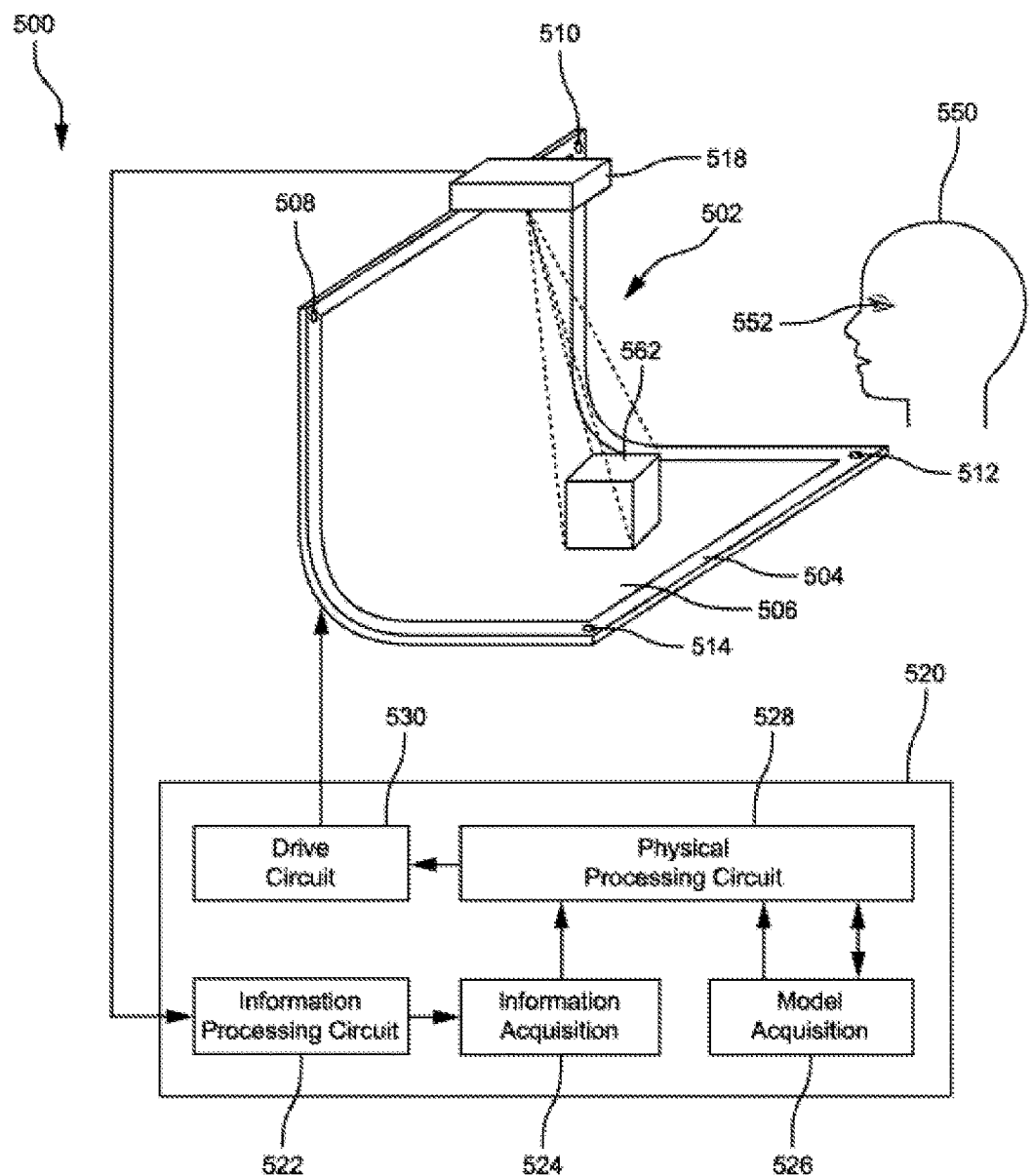
FIG. 5 illustrates an example configuration of basic components of a flexible electronic visual display device according to a third embodiment.

FIG. 5 illustrates an example set of basic components of a flexible electronic visual display device 500 according to a third embodiment. In this example, the flexible electronic visual display device 502 has a flexible housing 504, a flexible multi-touch display screen 506, four information capture elements 508, 510, 512, 514 positioned at various locations on the same side of the device as the display screen 506, a three-dimensional scanner device 518, and a control system 520 enabling the display device to capture sensor information and to scan and digitalize an arbitrary object 562 put on the horizontal surface of the electronic device.

The control system 520 includes an information processing circuit 522, an information acquisition component 524, a model acquisition component 526, a type of physical processing circuit 528, and a drive circuit 530. The four image sensors 508, 510, 512, 514 and the control system 520 work together in the same way as described in relation with the second embodiment illustrated in FIG. 4, so that a detailed description can be omitted here.

In addition in this example, the three-dimensional scanner device 518 recognizes and scans the object 562 put on the horizontal surface of the display device, and provide the captured information to the information processing circuit 522 of the control system 520. The information processing circuit determines the location of the object with respect to the display device and the object's shape, and provides the determined information about the position and shape of the object to the information acquisition component 324 of the control system for further processing by a suitable type of physical processing circuit 528.

On the basis of the information about the scanned object and additional related information provided by the model acquisition component 526, and the position information provided by the information acquisition component 524, the physical processing circuit 528 constructs a digital three-dimensional model of the object. The drive circuit 530 transfers the three-dimensional representations of the scanned object to other electronic devices connected with the control system 520 for further processing, as it would be apparent to somebody skilled in the art and therefor well known methods to scan and digitalize objects and mixing the outputs of a display device and a scanner device are not discussed further within this disclosure.

FIGS. 6A, 6B, and 6C illustrate a flexible electronic visual display device 602 with an adjustable means or stand for a flexible housing 604, which comprises a base 606 mechanically connected to the horizontal part of the housing, an adjustment member 608 mechanically connected to the vertical part of the housing, and a supporting means 610 sliding through the housing and the adjustment member. The base 606 and the supporting means 610 are pivotably connected by a rotary axis 612. It should be noted here that any person skilled in the art should be able to construct similar or other adjustable supporting means in various variants, which even can comprise an electric actuator for moving the supporting means, and that the shown adjustable supporting means is only meant as a non-limiting example.

FIG. 6A shows the display device in a first configuration 600 with the vertical surface standing upright. FIG. 6B shows the display device in a second configuration 620 with the vertical surface titled. As it can also be seen in the FIG. 6B the supporting means 608 slided through the housing and the member 610 towards the upper side of the display device. FIG. 6C shows the display device in a third configuration 640 with the base 606 and means 608 completely included within the housing and the vertical and horizontal surfaces laid out flat.

Figure 7A:
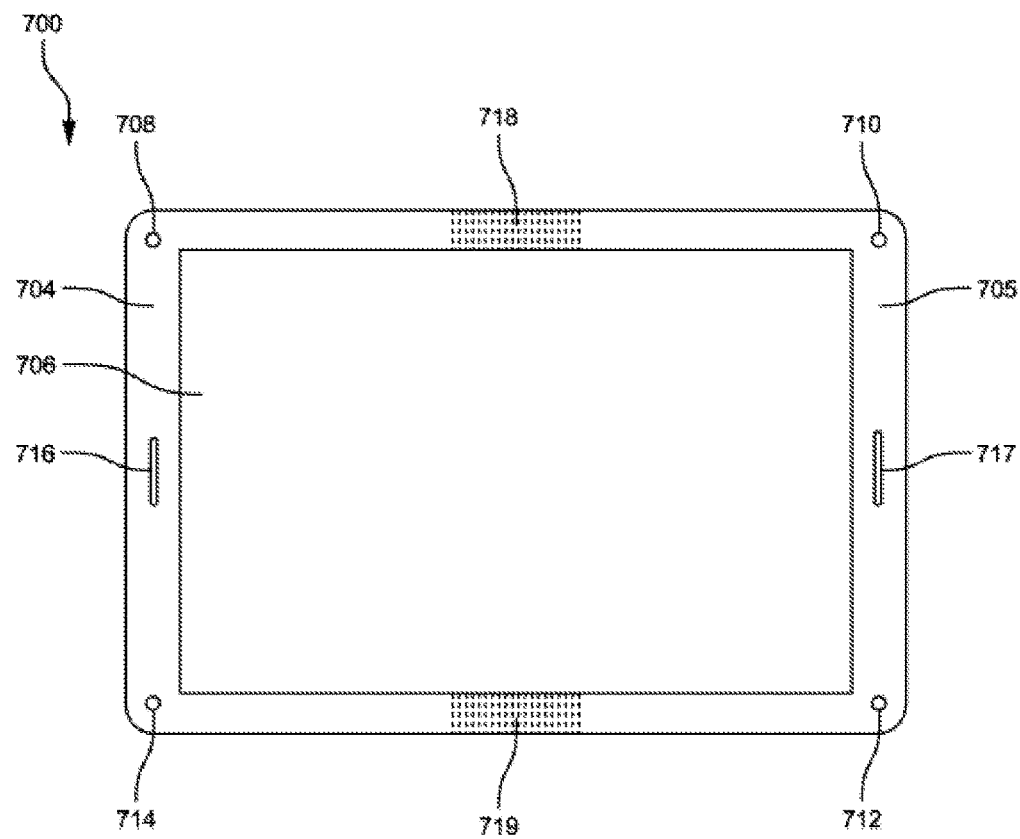
FIG. 7A illustrates a top view of an example portable flexible electronic visual display device according to a fourth embodiment.
Figure 7B:
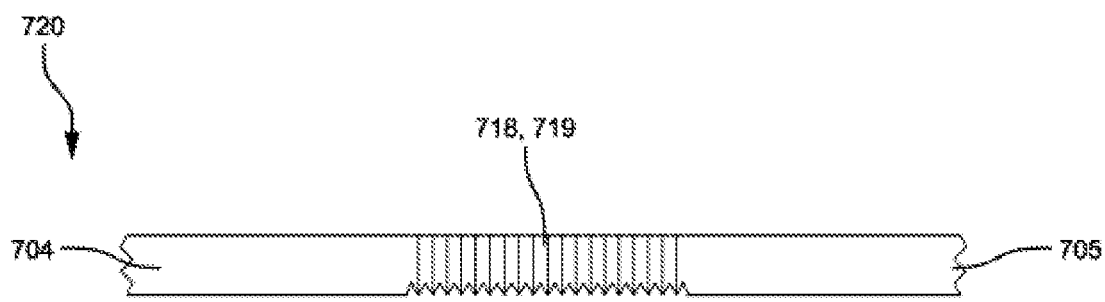
FIG. 7B illustrates a side view of a portion of the example portable flexible electronic visual display device shown in FIG. 7A laying out flat.
Figure 7C:
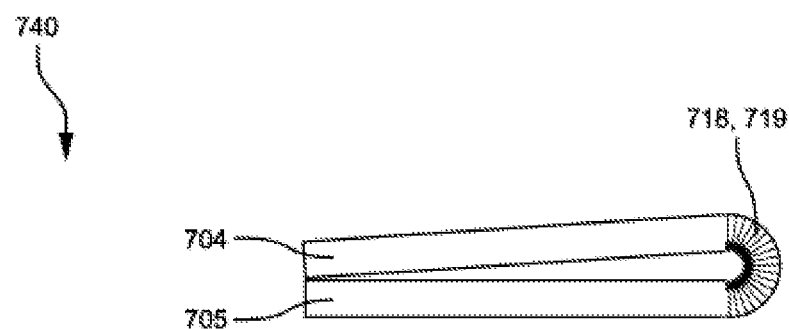
FIG. 7C illustrates a side view of the example portable flexible electronic visual display device shown in FIG. 7A being folded.

FIGS. 7A, 7B, and 7C illustrate an example portable computing device with a flexible electronic visual display device 702 that can be used to provide functions and perform methods in accordance with various embodiments discussed and suggested herein. In this example, the portable flexible computing device has a housing comprising two segments 704, 705, bellows-like joint means 718, 719 mechanically connecting the segments 704, 705 with each other, a display screen 706, four information capture elements 708, 710, 712, 714 positioned at various locations on the same side of the portable flexible computing device as the display screen 706, and integrated dual-array microphones and speakers 716, 717 enabling the portable flexible computing device to capture sensor information about a user of the electronic device during typical operation where the user is at least partially in front of the flexible electronic visual display screen, and to reproduce sound. FIG. 7A shows the portable flexible computing device in the flat laid out configuration 700 from the top, FIG. 7C shows a portion of the portable flexible computing device in the laid out flat configuration 720 from the side, and FIG. 7B shows the device in the folded configuration 740 from the side.

In this example, each capture element is a camera capable of capturing image information over a visible or/and infrared (IR) spectrum, and in at least some embodiments can select between visible and IR operational modes. It should be understood, however, that there can be fewer or additional elements of similar or alternative types in other embodiments, and that there can be combinations of cameras, infrared detectors, sensors, and other such elements used with various devices. The device can also have a material and/or components that enable a user to provide input to the device by applying pressure at one or more locations. The device housing segments 704, 705 can also include touch-sensitive material that enables a user to provide input by sliding a finger or other object along a portion of the housing. Various other elements and combinations of elements can be used as well within the scope of the various embodiments as should be apparent in light of the teachings and suggestions contained herein.

Not shown for better illustration are an electronic module comprising at least one integrated circuitry for processing arbitrary information and a data memory for storing arbitrary data, a wireless communication interface device connected with the electronic module, and an electric energy storage device for providing the portable flexible computing device with electric power. A similar computing device can be found, for example, in the U.S. patent publication No. 2013/0222246, published Aug. 29, 2013 and entitled "Navigation Approaches for Multi-Dimensional Input", which is already incorporated herein by reference.

Figure 8:
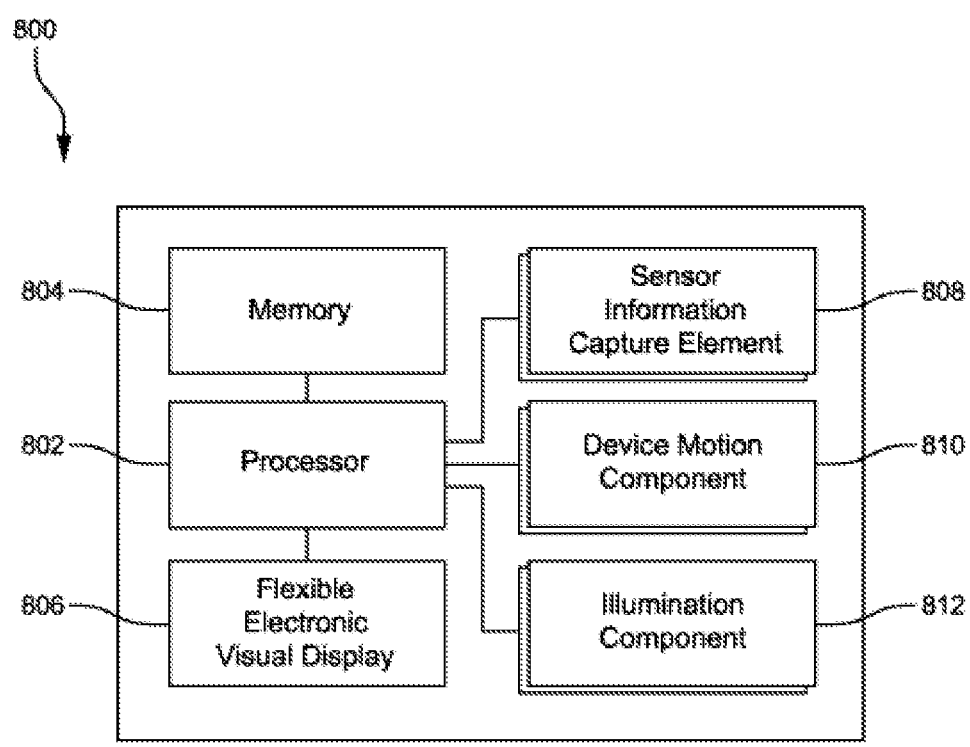
FIG. 8 illustrates an example configuration of components of a portable flexible electronic visual display device such as that illustrated in FIG. 7A.

In order to provide various functionality described herein, FIG. 8 illustrates an example set of basic components of a computing device 800 with a flexible electronic visual display device, such as the flexible computing device 700 described with respect to FIGS. 7A, 7B, and 7C.

In this example, the flexible computing device includes at least one central processor 802 for executing instructions that can be stored in at least one memory device or element 804. As would be apparent to one of ordinary skill in the art, the computing device can include many types of memory, data storage or non-transitory computer-readable storage media, such as a first data storage for program instructions for execution by the processor 802, the same or separate storage can be used for images, sounds, or data, a removable storage memory can be available for sharing information with other computing devices, etc. The computing device can also include a flexible display device 806 of various types as discussed elsewhere herein, and also might convey information via other means, such as through a projector device, audio speakers, or vibrators.

As discussed, the flexible computing device with a flexible electronic visual display device 806 in many embodiments includes at least one sensor information capture element 808, such as one or more cameras that are able to image a user of the computing device, or a three-dimensional depth sensor and three-dimensional scanner device that are able to scan an arbitrary object. The example computing device includes at least one motion component 810, such as one or more electronic gyroscopes or/and inertial sensors discussed elsewhere herein, used to determine motion of the computing device for assistance in information or/and input determination for controlling the hardware based functions, specifically the flexible display device 806 and other visual output devices, and also the software based functions. The computing device also can include at least one illumination element 812, as may include one or more light sources (e.g., white light LEDs, IR emitters, or flashlamps) for providing illumination and/or one or more light sensors or detectors for detecting ambient light or intensity, etc.

The example computing device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These input/output (I/O) devices could even be connected by a wireless infrared or other wireless link, or a wired link as well in some embodiments. In some embodiments, however, such a computing device might not include any buttons at all and might be controlled only through a combination of visual (e.g., gesture) and audio (e.g., spoken) commands such that a user can control the device without having to be in contact with the computing device.

The specification and drawings are, accordingly, to be regarded in an illustrative rather than a restrictive sense. It will, however, be evident that various modifications and changes may be made thereunto by those skilled in the art without departing from the broader spirit and scope of the invention as set forth in the claims. In other words, although embodiments have been described with reference to a number of illustrative embodiments thereof, this disclosure is not limited to those. Accordingly, in various embodiments of the invention the various embodiments of the information capture components and output devices of the flexible electronic visual display device discussed and suggested in FIGS. 3, 4, 5, 6A, 6B, and 6C, and 7A, 7B, and 7C can be combined with each other in appropriate ways. The scope of the present disclosure shall be determined only by the appended claims and their equivalents. In addition, variations and modifications in the component parts, arrangements, or/and alternative uses must be regarded as included in the appended claims.

The invention claimed is:

1. An electronic visual display device, comprising:
a flexible display device being configured to be observed directly and not projected;

at least one contactless three-dimensional sensor;
at least one integrated circuit based control system for controlling the display device by at least one sensor, and for performing other predetermined functions of the electronic visual display device; and
a flexible housing containing the flexible display device, and being configured to protect the display in the bent state from breaking,
wherein the housing further comprises:
  at least two segments; and
  at least one joint means,
    wherein said at least one joint means is mechanically connecting two adjacent housing segments, and further comprises:
      at least two supporting members; and
      a third member configured as a folding mechanism,
      wherein the supporting members are connected by a hinged mechanism at a first side,
      wherein the supporting members are connected by the third member at the other side opposite to the first side,
      wherein the supporting members determine the closing and opening angles as well as the bending radius of the housing by the dimensions of their length and width, and
      wherein the joint means is not thicker than the housing;
wherein the curvature of the electronic visual display device can be changed by at least 45 degrees.

2. The electronic visual display device of claim 1, further comprising:
at least one adjustable supporting means for keeping the flexible housing in at least one configuration.

3. The electronic visual display device of claim 1,
wherein the housing further comprises:
  at least one shape-memorizing element being configured to memorize the curvature of at least one joint means of the housing for keeping said at least one joint means in its last configuration.

4. The electronic visual display device of claim 1, further comprising:
at least one servo motor for changing the configuration of the flexible housing.

5. The electronic visual display device of claim 1,
wherein the flexible display device is a transparent display device.

6. The electronic visual display device of claim 1,
wherein the flexible display device is a touch screen.

7. The electronic visual display device of claim 1,
wherein the flexible display device is an autostereoscopic three-dimensional display device.

8. The electronic visual display device of claim 7,
wherein the flexible autostereoscopic display device is viewed with a pair of special polarized glasses.

9. The electronic visual display device of claim 7,
wherein the flexible autostereoscopic display device is viewed with a pair of special shutter glasses being synchronized with the refresh rate of the autostereoscopic display device.

10. The electronic visual display device of claim 1,
wherein the flexible display device includes at least one of (a) an active display, such as (b) a liquid crystal display, (c) a light-emitting diode display, (d) a quantum dot based light-emitting diode display, (e) a laser diode display, and (f) a vacuum field emission display, or (g) a passive or reflective display, such as (h) an electronic paper display, (i) an interferometric modulation display, and (j) an optoelectronic phase-changing film display.

11. The electronic visual display device of claim 1,
wherein the integrated circuit based control system is a flexible electronic circuitry.

12. The electronic visual display device of claim 1, further comprising:
an electronic module including:
  at least one processor for processing arbitrary information,
  at least one data memory for storing arbitrary data, and
  at least one additional integrated circuit based control circuitry being configured for performing predetermined functions of the electronic module,
  wherein said electronic module is connected to at least one integrated circuit based control system of the electronic visual display device.

13. The electronic visual display device of claim 12,
wherein the integrated circuit based control system of the electronic visual display device and the electronic module are integrated into one electronic system.

14. The electronic visual display device of claim 12,
wherein the electronic module is a flexible electronic circuitry.

15. The electronic visual display device of claim 12, further comprising:
a wireless communication interface device being configured to transmit and receive electromagnetic radiation, and to connect with other electrically operated devices,
wherein said wireless communication interface device is connected to the electronic module.

16. The electronic visual display device of claim 12, further comprising:
at least one rechargeable electrical energy storage device being configured to provide electric power to the electronic module,
wherein said at least one energy storage device is arranged within the flexible housing.

17. The electronic visual display device of claim 16,
wherein at least one rechargeable electrical energy storage device is a flexible battery.

18. The electronic visual display device of claim 1,
wherein at least one contactless three-dimensional sensor is an optical three-dimensional sensor.

19. The electronic visual display device of claim 18,
wherein at least one contactless optical three-dimensional sensor includes one of (a) a stereoscopic camera, (b) a time-of-flight camera, (c) a plenoptic camera or light-field camera, (d) a structured light camera, or (e) a modulated light camera.

20. The electronic visual display device of claim 1,
wherein at least one contactless three-dimensional sensor is an acoustical three-dimensional sensor.

21. The electronic visual display device of claim 20,
wherein at least one contactless acoustical three-dimensional sensor includes one of (a) a stereo-microphone, (b) a time-of-flight microphone, (c) a sound-field or acoustical wave-field microphone, or (d) a structured sound or structured acoustical wave microphone.

22. The electronic visual display device of claim 1,
wherein the flexible housing further comprises:
at least one touch-sensitive sensor.

23. The electronic visual display device of claim 1, further comprising:
at least one additional contactless sensor.

24. The electronic visual display device of claim 23, wherein at least one additional contactless sensor is an optical two-dimensional sensor.

25. The electronic visual display device of claim 23, wherein at least one additional contactless sensor is an acoustical two-dimensional sensor.

26. The electronic visual display device of claim 23, wherein at least one additional contactless sensor is a position detecting and motion tracking sensor being configured to track the movement of the electronic visual display device.

27. The electronic visual display device of claim 26, wherein at least one contactless position detecting and motion tracking sensor includes one of (a) an inertial sensor, (b) a compass, (c) a clinometer, (d) an inertial measurement unit comprising an accelerometer and at least one angular rate sensor, or (e) an inertial measurement unit comprising an accelerometer and at least one gyroscope.

28. The electronic visual display device of claim 1, further comprising:
a projector device being configured to project information to a surface,
wherein said projector device is connected to at least one integrated circuit based control system of the electronic visual display device.

29. The electronic visual display device of claim 1, further comprising:
at least one additional transmitter being configured to transmit electromagnetic radiation.

30. The electronic visual display device of claim 1, further comprising:
at least one receiver being configured to receive electromagnetic radiation.

31. The electronic visual display device of claim 1, further comprising:
at least one source of mechanical waves.

32. The electronic visual display device of claim 1, further comprising:
a conductive connection to an external power supply.

33. The electronic visual display device of claim 1, further comprising:
a wireless power supply on the basis of induction.

34. The electronic visual display device of claim 1, further comprising:
at least one jack to plug-in other devices.

35. An electronic visual display device, comprising:
a flexible display device being configured to be observed directly and not projected;
at least one contactless three-dimensional sensor;
at least one integrated circuit based control system for controlling the display device by at least one sensor, and for performing other predetermined functions of the electronic visual display device; and
a flexible housing containing the flexible display device, and configured to protect the display in the bent state from breaking,
wherein the housing further comprises:
at least two segments;
at least one joint means; and
at least one spring for keeping at least one joint of the housing in at least one configuration;
wherein said at least one joint means is mechanically connecting two adjacent housing segments;
wherein the curvature of the electronic visual display device can be changed by at least 45 degrees.

36. An electronic visual display device, comprising:
a flexible display device being configured to be observed directly and not projected,
wherein the flexible display device is a multi-layer display device including:
at least two individually controllable display screens as layers;
at least one contactless three-dimensional sensor;
at least one integrated circuit based control system for controlling the display device by at least one sensor, and for performing other predetermined functions of the electronic visual display device; and
a flexible housing containing the flexible display device, and being configured to protect the display in the bent state from breaking;
wherein the curvature of the electronic visual display device can be changed by at least 45 degrees.

37. The electronic visual display device of claim 36, wherein at least one contactless three-dimensional sensor is configured to detect the position and track the motion of the user; and
wherein at least one integrated circuit based control system is configured to control the individually controllable display screens of the flexible autostereoscopic three-dimensional multi-layer display device by said at least one position detecting and motion tracking sensor, so that a user is experiencing a perception of depth respectively a spatial visual effect when viewing information presented by the display device.

* * * * *